(12) United States Patent
Subrahmanyam et al.

(10) Patent No.: US 7,636,831 B1
(45) Date of Patent: Dec. 22, 2009

(54) OPTIMIZATION OF REVERSE MAPPINGS FOR IMMUTABLE GUEST PHYSICAL PAGES OF VIRTUAL MEMORIES IN A VIRTUALIZED COMPUTER SYSTEM

(75) Inventors: Pratap Subrahmanyam, Sunnyvale, CA (US); Garrett Smith, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 272 days.

(21) Appl. No.: 11/394,763

(22) Filed: Mar. 31, 2006

(51) Int. Cl.
*G06F 9/34* (2006.01)
*G06F 12/10* (2006.01)
*G06F 12/00* (2006.01)

(52) U.S. Cl. .............................. 711/206; 711/6; 711/203
(58) Field of Classification Search ................ 711/6, 711/203, 205
See application file for complete search history.

(56) References Cited

U.S. PATENT DOCUMENTS

| | | |
|---|---|---|
| 6,789,156 B1 * | 9/2004 | Waldspurger ................. 711/6 |
| 6,961,806 B1 | 11/2005 | Agesen et al. |
| 7,069,413 B1 | 6/2006 | Agesen et al. |
| 7,222,221 B1 | 5/2007 | Agesen et al. |
| 7,412,492 B1 | 8/2008 | Waldspurger |
| 2005/0172098 A1 * | 8/2005 | Worley ....................... 711/206 |
| 2005/0188374 A1 * | 8/2005 | Magenheimer ............. 718/100 |
| 2006/0206658 A1 * | 9/2006 | Hendel et al. .................. 711/6 |
| 2006/0259734 A1 * | 11/2006 | Sheu et al. ................... 711/203 |

OTHER PUBLICATIONS

Waldspurger, Carl. "Memory Resource Management in VMware ESX Server," Dec. 2002, Fifth Symposium on Operating Systems Design and Implementation, pp. 1-14.*

* cited by examiner

*Primary Examiner*—Matt Kim
*Assistant Examiner*—Michael C Krofcheck (57) ABSTRACT

For a virtual memory of a virtualized computer system in which a virtual page is mapped to a guest physical page which is backed by a machine page and in which a shadow page table entry directly maps the virtual page to the machine page, reverse mappings of guest physical pages are optimized by removing the reverse mappings of certain immutable guest physical pages. An immutable guest physical memory page is identified, and existing reverse mappings corresponding to the immutable guest physical page are removed. New reverse mappings corresponding to the identified immutable guest physical page are no longer added.

28 Claims, 5 Drawing Sheets

OPTIMIZATION OF REVERSE MAPPINGS FOR IMMUTABLE GUEST PHYSICAL PAGES OF VIRTUAL MEMORIES IN A VIRTUALIZED COMPUTER SYSTEM

BACKGROUND OF THE INVENTION

1. Field of the Invention

This invention relates generally to computer virtualization and, in particular, to a method and system for optimizing reverse mappings for guest physical pages of virtual memories in a virtualized computer system.

2. Description of the Related Art

The advantages of virtual machine technology have become widely recognized. Among these advantages is the ability to run multiple virtual machines on a single host platform. This makes better use of the capacity of the hardware, while still ensuring that each user enjoys the features of a "complete" computer. Depending on how it is implemented, virtualization also provides greater security, since the virtualization can isolate potentially unstable or unsafe software so that it cannot adversely affect the hardware state or system files required for running the physical (as opposed to virtual) hardware.

Figure 1:
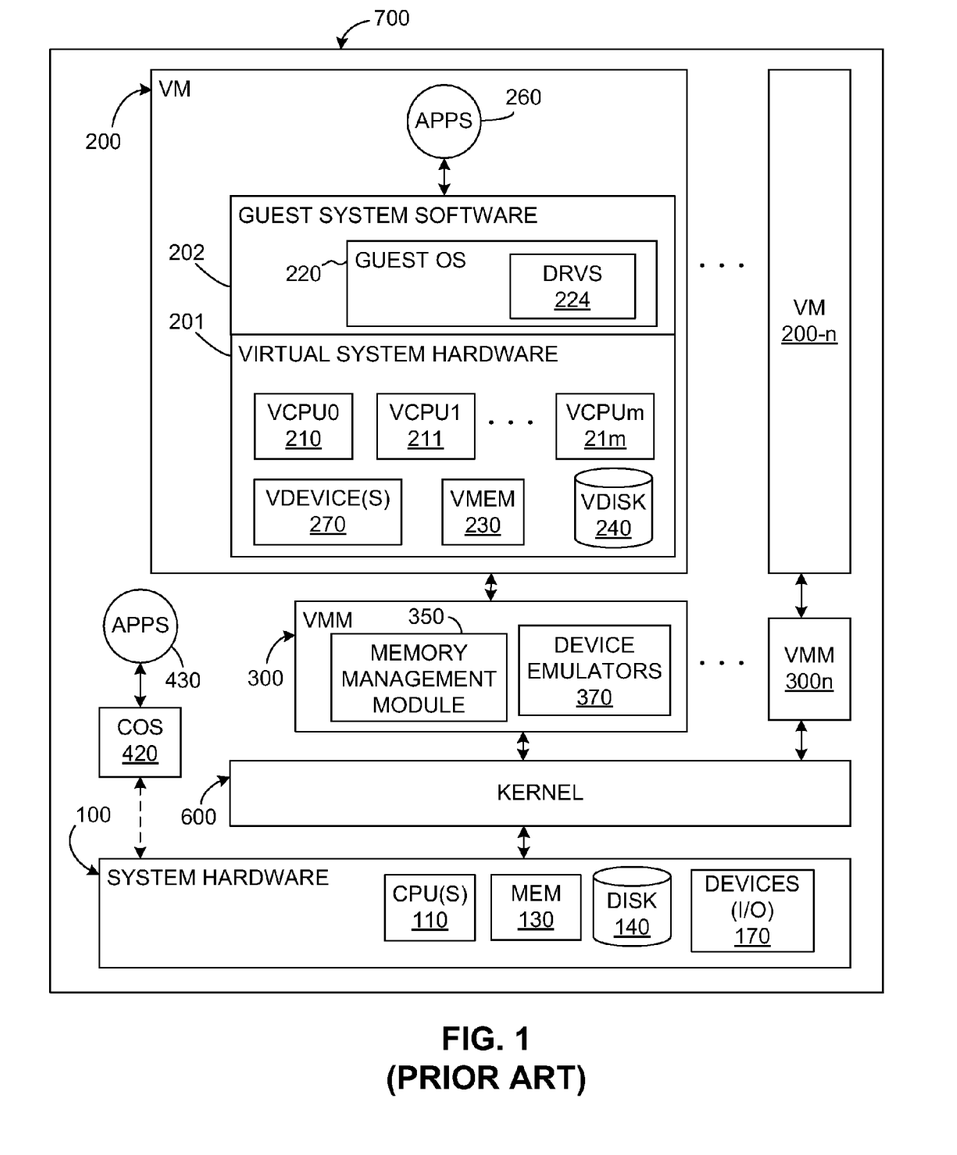
FIG. 1 illustrates a non-hosted virtualized system.

As is well known in the field of computer science, a virtual machine (VM) is a software abstraction—a "virtualization"—of an actual physical computer system. FIG. 1 shows one possible arrangement of a computer system 700 that implements virtualization. A virtual machine (VM) 200, which in this system is a "guest," is installed on a "host platform," or simply "host," which will include a system hardware 100, that is, a hardware platform, and one or more layers or co-resident components comprising system-level software, such as an operating system (OS) or similar software layer responsible for coordinating and mediating access to the hardware resources.

As software, the code defining the VM 200 will ultimately execute on the actual system hardware 100. As in almost all computers, this hardware 100 will include one or more CPUs 110, some form of memory 130 (volatile or non-volatile), one or more storage devices such as one or more disks 140, and one or more devices 170, which may be integral or separate and removable.

In many existing virtualized systems, the hardware processor(s) 110 are the same as in a non-virtualized computer with the same platform, for example, the Intel x-86 platform. Because of the advantages of virtualization, however, some hardware processors have also been developed to include specific hardware support for virtualization.

Each VM 200 will typically mimic the general structure of a physical computer and as such will usually have both virtual system hardware 201 and guest system software 202. The virtual system hardware 201 typically includes at least one virtual CPU 210, virtual memory (VMEM) 230, at least one virtual disk (VDISK) 240 or similar virtualized mass storage device, and one or more virtual devices (VDEVICE) 270. Note that a storage disk—virtual 240 or physical 140—is also a "device," but is usually considered separately because of the important role it plays. All of the virtual hardware components of the VM 200 may be implemented in software to emulate corresponding physical components. The guest system software 202 includes a guest operating system (OS) 220 and drivers 224 as needed, for example, for the various virtual devices 270.

To permit computer systems to scale to larger numbers of concurrent threads, systems with multiple CPUs—physical or logical, or a combination—have been developed. One example is a symmetric multi-processor (SMP) system, which is available as an extension of the PC platform and from other vendors. Essentially, an SMP system is a hardware platform that connects multiple processors to a shared main memory and shared I/O devices. Yet another configuration is found in a so-called "multi-cored" architecture, in which more than one physical CPU is fabricated on a single chip, with its own set of functional units (such as a floating-point unit and an arithmetic/logic unit ALU), and can execute threads independently; multi-cored processors typically share only very limited resources, such as at least some cache. Still another technique that provides for simultaneous execution of multiple threads is referred to as "simultaneous multi-threading," in which more than one logical CPU (hardware thread) operates simultaneously on a single chip, but in which the logical CPUs flexibly share not only one or more caches, but also some functional unit(s) and sometimes also the translation lookaside buffer (TLB).

Similarly, a single VM may (but need not) be configured with more than one virtualized physical and/or logical processor. By way of example, FIG. 1 illustrates multiple virtual processors 210, 211, . . . , 21m (VCPU0, VCPU1, . . . , VCPUm) within the VM 200. Each virtualized processor in a VM may also be multi-cored, or multi-threaded, or both, depending on the virtualization. This invention may be used to advantage regardless of the number of processors the VMs are configured to have.

If the VM 200 is properly designed, applications (APPS) 260 running on the VM will function as they would if run on a "real" computer, even though the applications are running at least partially indirectly, that is via the guest OS 220 and virtual processor(s). Executable files will be accessed by the guest OS 220 from the virtual disk 240 or virtual memory 230, which will be portions of the actual physical disk 140 or memory 130 allocated to that VM 200. Once an application 260 is installed within the VM 200, the guest OS 220 retrieves files from the virtual disk 240 just as if the files had been pre-stored as the result of a conventional installation of the application. The design and operation of virtual machines in general are known in the field of computer science.

Some interface is generally required between the guest software within a VM 200 and the various hardware components and devices in the underlying hardware platform. This interface—referred to in this text as "virtualization software"—may include one or more software components and/or layers, possibly including one or more of the software components known in the field of virtual machine technology as "virtual machine monitors" (VMMs), "hypervisors," or virtualization "kernels." Because virtualization terminology has evolved over time and has not yet become fully standardized, these terms do not always provide clear distinctions between the software layers and components to which they refer. For example, "hypervisor" is often used to describe both a VMM and a kernel together, either as separate but cooperating components or with one or more VMMs incorporated wholly or partially into the kernel itself; however, "hypervisor" is sometimes used instead to mean some variant of a VMM alone, which interfaces with some other software layer(s) or component(s) to support the virtualization. Moreover, in some systems, some virtualization code is included in at least one "superior" VM to facilitate the operations of other VMs. Furthermore, specific software support for VMs is sometimes included in the host OS itself.

Unless otherwise indicated, the invention described below may be used in virtualized computer systems having any type or configuration of virtualization software. Moreover, the invention is described and illustrated below primarily as including one or more virtual machine monitors that appear as separate entities from other components of the virtualization software. This is only for the sake of simplicity and clarity and by way of illustration—as mentioned above, the distinctions are not always so clear-cut. Again, unless otherwise indicated or apparent from the description, it is to be assumed that the invention can be implemented anywhere within the overall structure of the virtualization software.

By way of illustration and example only, the figures show each VM running on a corresponding virtual machine monitor. The description's reference to VMMs is also merely by way of common example. A VMM is usually a software component that virtualizes at least one hardware resource of some physical platform, so as to export a hardware interface to the VM corresponding to the hardware the VM "thinks" it is running on. As FIG. 1 illustrates, a virtualized computer system may (and usually will) have more than one VM, each of which may be running on its own VMM.

The various virtualized hardware components in the VM 200, such as the virtual CPU(s) 210, etc., the virtual memory 230, the virtual disk 240, and the virtual device(s) 270, are shown as being part of the VM 200 for the sake of conceptual simplicity. In actuality, these "components" are often implemented as software emulations included in the VMM 300. One advantage of such an arrangement is that the virtualization software may (but need not) be set up to expose "generic" devices, which facilitate, for example, migration of VM from one hardware platform to another.

Different systems may implement virtualization to different degrees—"virtualization" generally relates to a spectrum of definitions rather than to a bright line, and often reflects a design choice in respect to a trade-off between speed and efficiency on the one hand and isolation and universality on the other hand. For example, "full virtualization" is sometimes used to denote a system in which no software components of any form are included in the guest other than those that would be found in a non-virtualized computer; thus, the guest OS could be an off-the-shelf, commercially available OS with no components included specifically to support use in a virtualized environment.

In contrast, another concept, which has yet to achieve a universally accepted definition, is that of "para-virtualization." As the name implies, a "para-virtualized" system is not "fully" virtualized, but rather the guest is configured in some way to provide certain features that facilitate virtualization. For example, the guest in some para-virtualized systems is designed to avoid hard-to-virtualize operations and configurations, such as by avoiding certain privileged instructions, certain memory address ranges, etc. As another example, many para-virtualized systems include an interface within the guest that enables explicit calls to other components of the virtualization software. For some, para-virtualization implies that the guest OS (in particular, its kernel) is specifically designed to support such an interface. According to this view, having, for example, an off-the-shelf version of Microsoft Windows XP as the guest OS would not be consistent with the notion of para-virtualization. Others define para-virtualization more broadly to include any guest OS with any code that is specifically intended to provide information directly to the other virtualization software. According to this view, loading a module such as a driver designed to communicate with other virtualization components renders the system para-virtualized, even if the guest OS as such is an off-the-shelf, commercially available OS not specifically designed to support a virtualized computer system.

Unless otherwise indicated or apparent, this invention is not restricted to use in systems with any particular "degree" of virtualization and is not to be limited to any particular notion of full or partial ("para-") virtualization.

In addition to the distinction between full and partial (para-) virtualization, two arrangements of intermediate system-level software layer(s) are in general use as, or as part of, the virtualization software—a "hosted" configuration (illustrated in FIG. 2) and a non-hosted configuration (illustrated in FIG. 1). In a hosted virtualized computer system, an existing, general-purpose operating system forms a "host" OS 420 that is used to perform certain input/output (I/O) operations, alongside and sometimes at the request and direction of a virtualization software component such as the VMM 300. The host OS 420 usually includes drivers 424 and supports applications 460 of its own, and the VMM 300 (or similar component) are both able to directly access at least some of the same hardware resources, with conflicts being avoided by a context-switching mechanism. The Workstation product of VMware, Inc., of Palo Alto, Calif., is an example of a hosted, virtualized computer system, which is also explained in U.S. Pat. No. 6,496,847 (Bugnion, et al., "System and Method for Virtualizing Computer Systems," 17 Dec. 2002).

Figure 2:
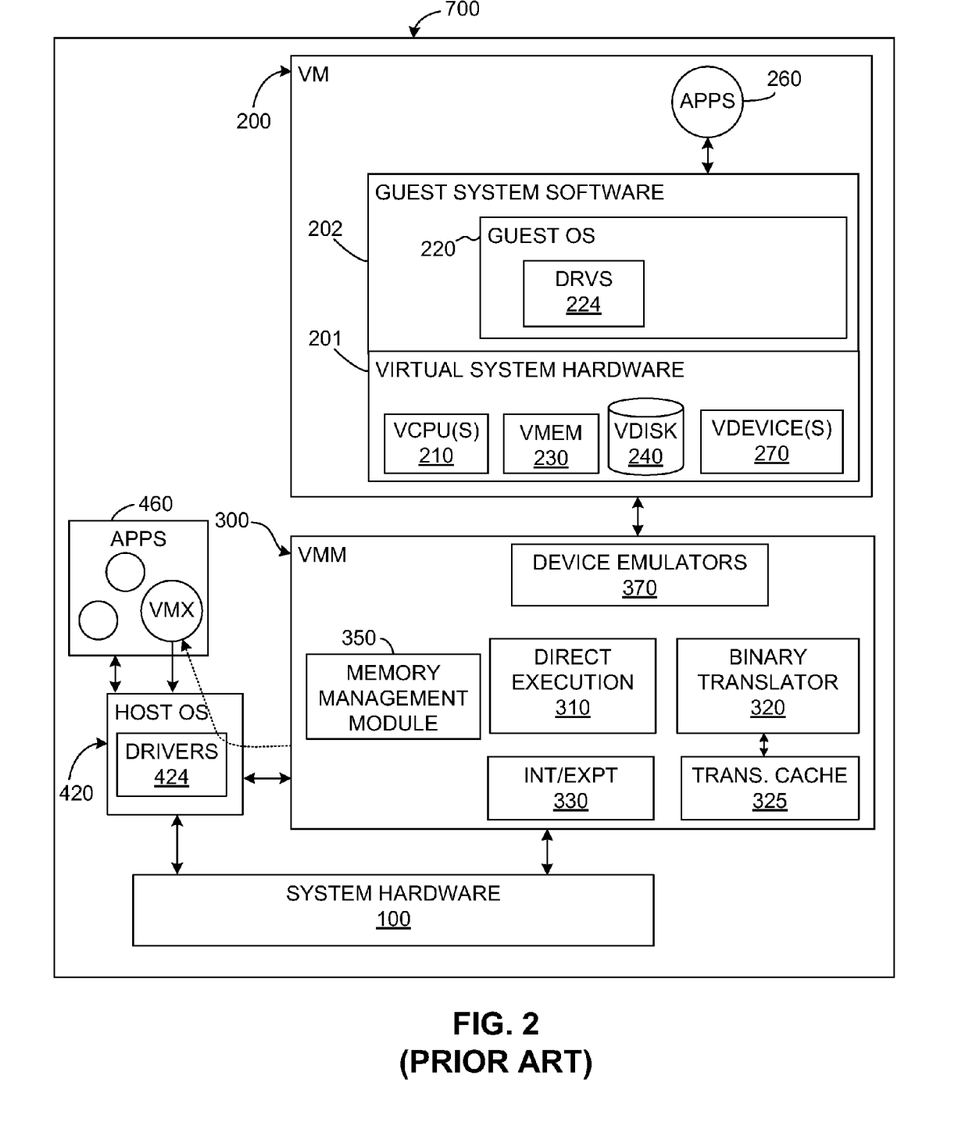
FIG. 2 illustrates a hosted virtualized system.

In addition to device emulators 370, FIG. 2 also illustrates some of the other components that are also often included in the VMM of a hosted virtualization system; many of these components are found in the VMM of a non-hosted system as well. For example, the memory management module 350 manages the translations between guest virtual memory addresses, guest physical memory addresses, and machine memory addresses for the virtual memory (VMEM) 230 of the virtualized system. For another example, exception handlers 330 may be included to help context-switching (see again U.S. Pat. No. 6,496,847), and a direct execution engine 310 and a binary translator 320, often with an associated translation cache 325, may be included to provide execution speed while still preventing the VM 200 from directly executing certain privileged instructions in systems that do not otherwise provide such protection (see U.S. Pat. No. 6,397,242, Devine, et al., "Virtualization System Including a Virtual Machine Monitor for a Computer with a Segmented Architecture," 28 May 2002).

In many cases, it may be beneficial to deploy VMMs on top of a software layer—a kernel 600—constructed specifically to provide efficient support for the VMs. This configuration is frequently referred to as being "non-hosted." Compared with a system in which VMMs (or other software components or layers with similar functionality) run directly on the hardware platform (such as shown in FIG. 2), use of a kernel 600 offers greater modularity and facilitates provision of services (for example, resource management) that extend across multiple virtual machines. Compared with a hosted deployment, a kernel 600 may offer greater performance because it can be co-developed with the VMM and be optimized for the characteristics of a workload consisting primarily of VMs/VMMs. The kernel 60Q also handles any other applications running on it that can be separately scheduled, as well as any temporary "console" operating system (COS) 420 that, in some systems, is included for such operations as boot the system as a whole or enabling certain user interactions with the kernel. The console OS 420 in FIG. 1 may be of the same type as the host OS 420 in FIG. 2, which is why they are identically numbered—the main difference is the role they play (or are allowed to play, if any) once the virtualized computer system is loaded and running. One example of a non-hosted, virtualized computer system is described in U.S. Pat. No. 6,961,941 (Nelson, et al., "Computer Configuration for Resource Management in Systems Including a Virtual Machine," 1 Nov. 2005.)

The present invention as described herein may be used to advantage in both a hosted and a non-hosted virtualized computer system, regardless of the degree of virtualization, in which the virtual machine(s) have any number of physical and/or logical virtualized processors. The present invention may also be implemented directly in a computer's primary OS, both where the OS is designed to support virtual machines and where it is not. Moreover, the invention may even be implemented wholly or partially in hardware, for example in processor architectures intended to provide hardware support for virtual machines.

Figure 3:
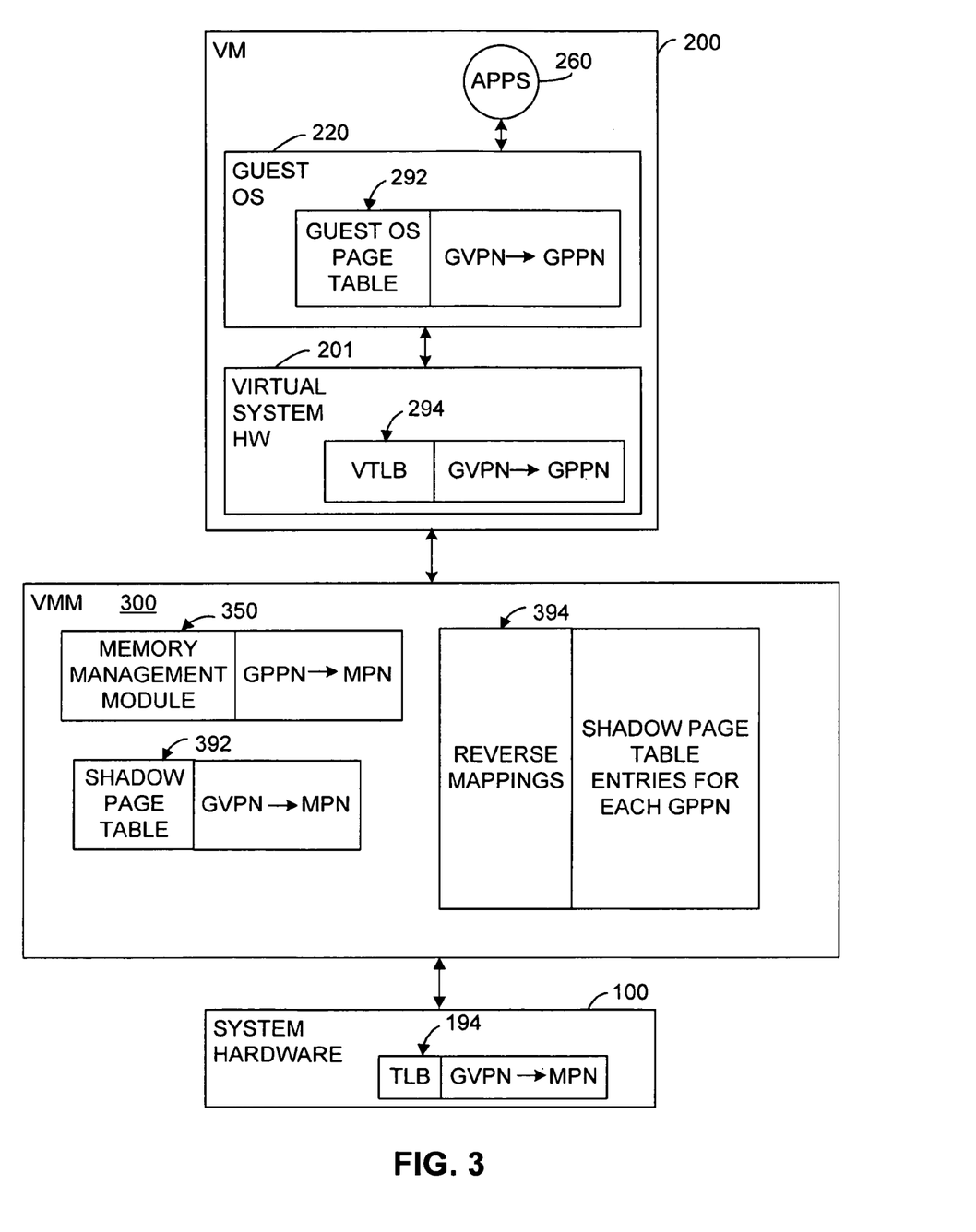
FIG. 3 illustrates virtual memory management and address mapping functions performed by the memory management module and other various components of the virtualized computer system.

FIG. 3 illustrates virtual memory management and address mapping functions performed by the memory management module 350 and other various components of the virtualized computer system. The guest OS 220 generates a guest OS page table 292. The guest OS page table 292 contains mappings from GVPNs (Guest Virtual Page Numbers) to GPPNs (Guest Physical Page Numbers). Suppose that a guest application 260 attempts to access a memory location having a first GVPN, and that the guest OS 220 has specified in the guest OS page table 292 that the first GVPN is backed by what it believes to be a physical memory page having a first GPPN. The mapping from the first GVPN to the first GPPN is used by the virtual system hardware 201, and it is loaded into a VTLB (Virtual Translation Look-Aside Buffer) 294. The memory management module 350 translates the first GPPN into a corresponding MPN (Machine Page Number), say a first MPN. The memory management module 350 creates a shadow page table 392, and inserts a translation into the shadow page table 392 mapping the first GVPN to the first MPN. In other words, the memory management module creates shadow page tables 392 containing the mapping from the GVPN to the MPN. This mapping from the first GVPN to the first MPN is used by the system hardware 100 and is loaded into the TLB (Translation Look-Aside Buffer) 194 to access the actual hardware storage device that is backing up the GVPN.

Note that the terms "guest virtual page number (GVPN)" and "guest virtual page" are used synonymously herein with the terms "virtual page number" and "virtual page," respectively, and with the terms "linear page number" and "linear page," respectively. Also note that the term "guest physical page number" and "guest physical page" are used synonymously herein with the terms "virtual physical page number" and "virtual physical page," respectively, because they are not real physical page numbers or physical addresses but what the virtual machine 200 believes to be the physical page number and physical address. Finally, note that the terms "machine page number" and "machine page" are used synonymously herein with the terms "physical page number" and "physical page," respectively, because they are the real physical page number and real physical address corresponding to the machine or hardware memory of the host computer.

When a shadow page table entry 392 is created, the VMM 300 also creates a reverse mapping 394 from the guest (virtual) physical page to the shadow page table entry. In other words, the reverse mappings contain, for each guest (virtual) physical page, the shadow page table entries 392 corresponding to that guest physical page.

Reverse mappings are initially stored in a "physical page descriptor" (not shown) that the VMM 300 maintains to describe the guest physical page that is mapped. The physical page descriptor keeps track of which machine page, if any, is used by the VMM 300 to back the guest physical page. Once the guest physical page has more reverse mappings than will fit into the physical page descriptor, the reverse mappings are moved into what is called a "backmap." The backmap is shared between all guest physical pages, and typically holds linked lists of fixed sized blocks, one list per guest physical page. Each block stores a fixed number of reverse mappings. Each physical page descriptor has a pointer to the start of the linked list holding its reverse mappings in the backmap.

The reverse mapping is used in various ways. For example, reverse mappings may be used to implement Copy on Write for guest physical memory or to swap out guest physical memory. For another example, "invalidating backing store" is the ability to remove or change the machine page that is used by the VMM 300 to back a particular guest physical page in the VM 200. This changes the guest physical page to machine page mapping that the VMM 300 uses. When the guest physical page to machine page mapping is changed, the VMM 300 needs to remove all mappings based on the old guest physical page to machine page mapping. One of the major places where such old mappings exist is the shadow page tables 392. Removing such old mappings is accomplished by iterating over all of the reverse mappings 394 for the virtual physical page and removing the mappings they point to. For another example, reverse mappings may be used to install "read" or "write" traces to the guest physical page.

For various reasons, there can be a large number of reverse mappings for a single guest (virtual) physical page. For example, the guest OS 220 may use several different guest OS page tables 292 to map the same guest virtual page to the same guest physical page. In such case, a new shadow page table entry 392 and a reverse mapping 394 will be created for each page table 292 in the guest OS 220, resulting in multiple reverse mappings 394 for the same guest physical page. For another example, the guest OS 220 may map the same guest physical page to various different guest virtual pages. In such case too, a new shadow page table entry 392 and a reverse mapping 394 will be created for each page table 292 in the guest OS 220, resulting in multiple reverse mappings 394 for the same guest physical page. In general, there is one reverse mapping 394 for each active shadow page table entry 392.

Needless to say, maintaining these reverse mappings 394 is a major performance overhead for the virtualized computer system. Some of this overhead can be reduced by improving or simplifying the data structures for such reverse mappings 394, as in the conventional art. However, there is a limit to the efficiency of such data structures.

Therefore, there is a need for a technique for identifying certain guest physical pages that do not require storage of reverse mappings, thereby reducing the overhead of the virtualized computer system. There is also a need for a technique for recovering from misidentification of such guest physical pages that do not require storage of reverse mappings.

SUMMARY OF THE INVENTION

In a virtual memory of a virtualized computer system where a virtual page is mapped to a guest physical page which is backed by a machine page and in which a shadow page table entry directly maps the virtual page to the machine page, reverse mappings of guest physical pages are optimized by removing the reverse mappings of certain immutable guest physical pages. The reverse mappings point at shadow page table entries corresponding to the guest physical memory page. An immutable guest physical page is identified, and existing reverse mappings corresponding to the identified immutable guest physical page are removed. In addition, new reverse mappings corresponding to the identified immutable guest physical page are no longer added.

Examples of the immutable guest physical page include zero pages that are designated read-only. Thus, the immutable guest physical page is identified by identifying a guest physical page storing zero as a candidate page, determining the number of reverse mappings corresponding to the candidate page during a predetermined period, and responsive to the number of reverse mappings exceeding a predetermined threshold, identifying the candidate page as the immutable guest physical page. In one embodiment, it is further determined whether the candidate page is designated read-only, and if it is designated read-only, the candidate page is identified as the immutable guest physical page. If the immutable guest physical page is erroneously identified, a virtual memory recovery process such as a full shadow page table scan is performed to remove all forward mappings for the erroneously identified guest physical page, and the reverse mapping optimization process is deactivated.

The present invention has the advantage that reverse mappings for certain immutable guest physical pages need not be stored, thereby significantly reducing the amount of reverse mappings stored, enhancing the efficiency, and reducing the overhead of the overall virtualized computer system.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the present invention can be readily understood by considering the following detailed description in conjunction with the accompanying drawings.

DETAILED DESCRIPTION OF EMBODIMENTS

The Figures (FIG.) and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 4:
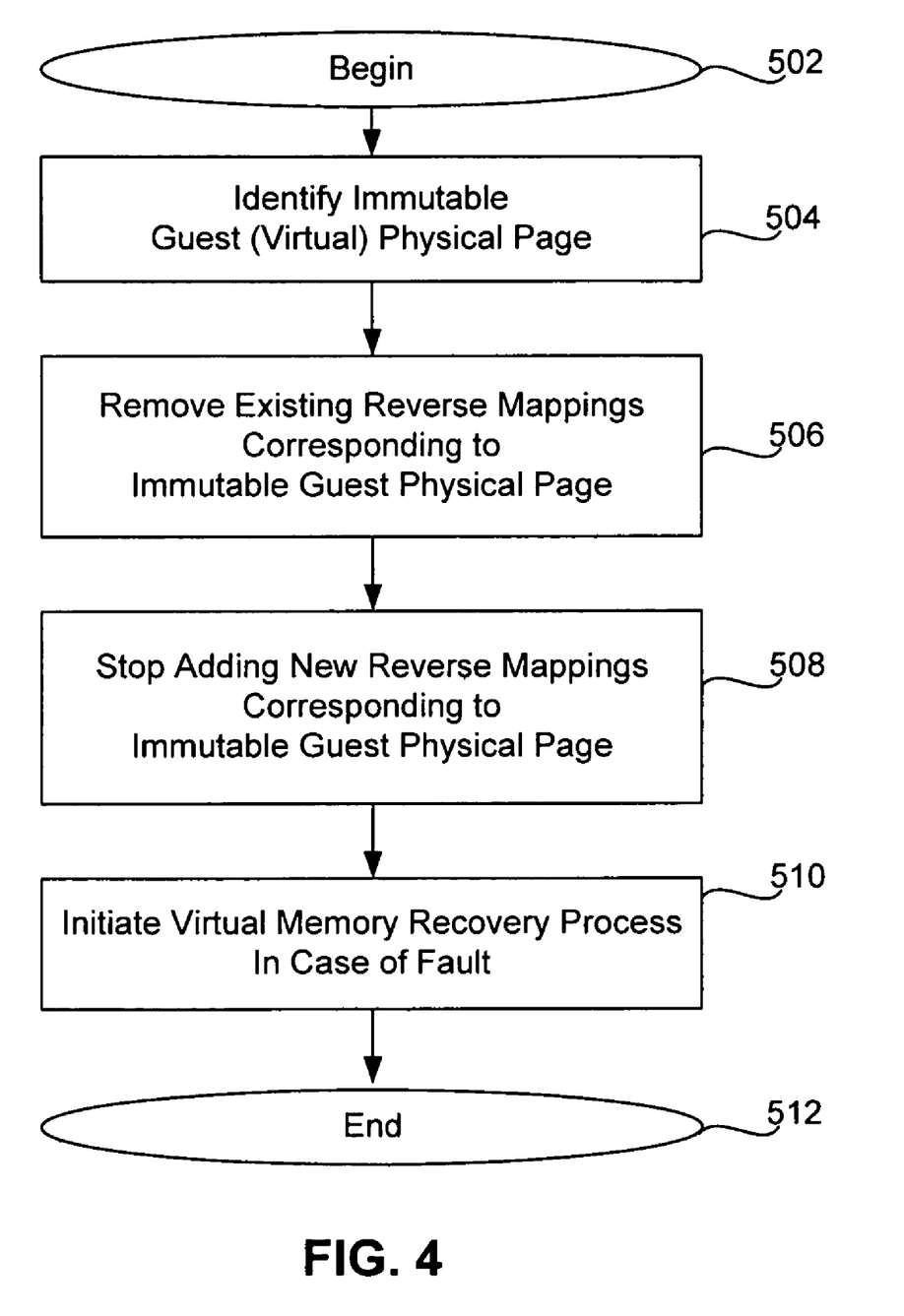
FIG. 4 illustrates a method for optimizing reverse mappings corresponding to guest physical pages of a virtual memory in a virtualized computer system, according to one embodiment of the present invention.

FIG. 4 illustrates a method for optimizing reverse mappings corresponding to guest physical pages of a virtual memory in a virtualized computer system, according to one embodiment of the present invention. According to the present invention, reverse mappings corresponding to certain types of guest physical pages need not be stored. Such guest physical pages are in general guest physical pages that have nothing but read-only type mappings. A consideration to make in this approach is that by not tracking reverse mappings for a certain virtual physical page, it becomes burdensome for the virtualized computer system to change or remove a machine page backing that virtual physical page. Since the VMM 300 is free to choose which virtual physical pages it will reclaim machine pages from, the difficulty in changing or removing a machine page backing the virtual physical page does not prevent the use of the reverse mapping optimization method of the present invention but merely limits the number of guest physical pages for which the read-only reverse mappings can be discarded. Therefore, it is useful to determine which guest physical pages have a large number of read-only reverse mappings and to apply the reverse mapping optimization method of the present invention to those guest physical pages.

In this regard, as the reverse mapping optimization method begins 502, the memory management module 350 first identifies 504 an immutable guest (virtual) physical page that would not need storage of reverse mappings. The immutable guest (virtual) physical pages are guest physical pages that do not mutate and thus are constant. One example of such immutable page would be the page "empty_zero_page" that Linux uses to map /dev/zero, if the guest OS 220 is a Linux-type operating system. The Linux "empty_zero_page" will be referred to herein as the "zero page." Step 504 will be explained in more detail with reference to FIG. 5, with the zero page as an example of the immutable guest physical page. However, note that there can be other examples of immutable pages depending upon the guest OS 220, and thus the present invention is not limited to any particular type of immutable guest physical page or the zero page. For example, a code page of a shared library that is used by a large number of applications can be an immutable guest page.

The zero page does not require reverse mappings, because if the zero page is always zero, Linux in general should not be using the zero page in a way that would cause traces to be installed on it. Thus, traces are typically not installed on the zero page.

With regard to the use of the reverse mappings of a zero page for invalidating backing store, the VMM 300 can avoid returning the zero page when the VMM 300 is responding to memory pressure. Thus, the reverse mappings for the zero page are not necessary for invalidating backing store. A problem may arise when Linux remaps the guest physical memory region containing the zero page and the reverse mappings have been removed, however, the VMM 300 can cope with the problem by performing a full page shadow page table scan in that situation.

Figure 5:
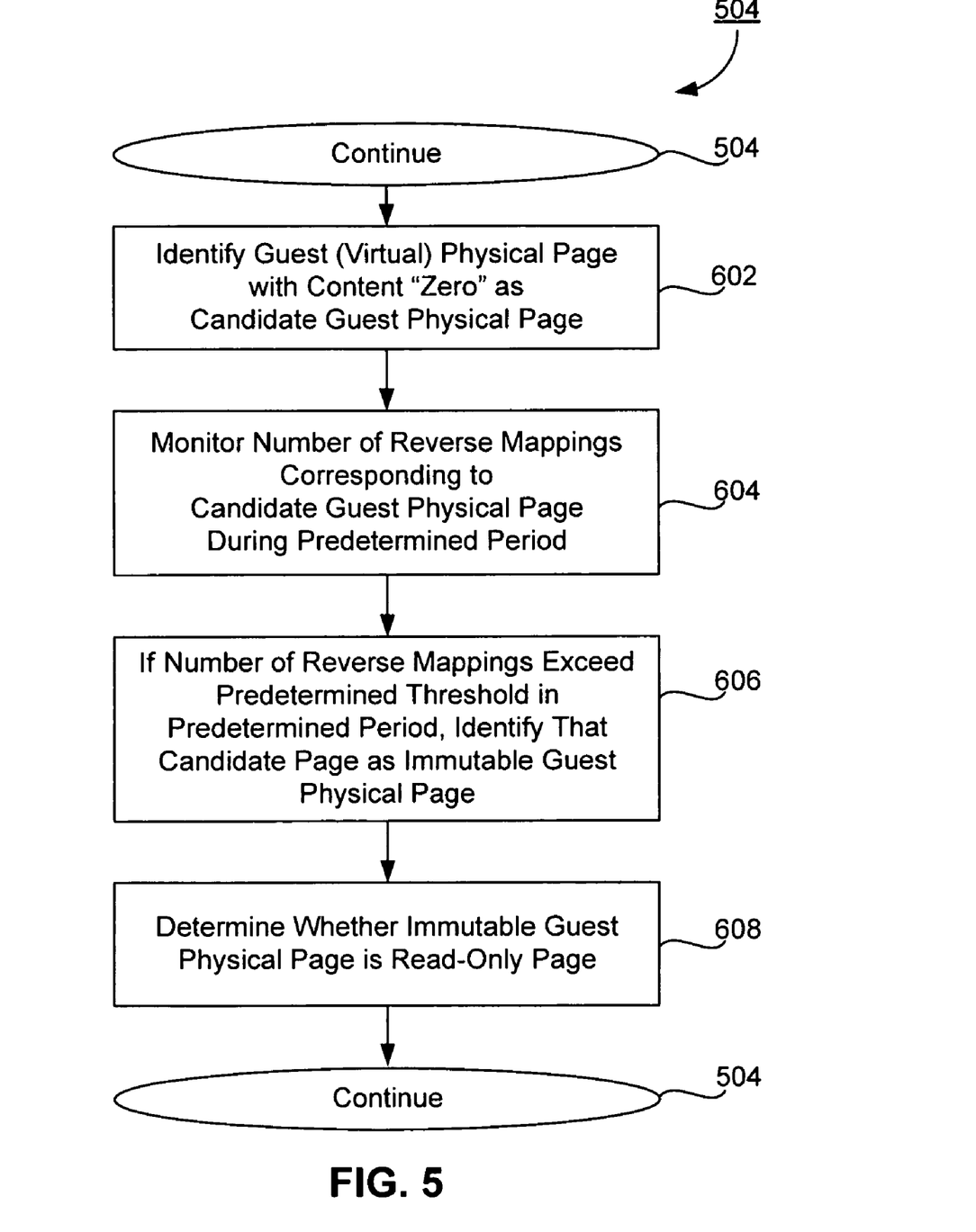
FIG. 5 illustrates a method for identifying guest physical pages that do not require storage of reverse mappings, according to one embodiment of the present invention.

FIG. 5 illustrates the heuristic of step 504 in more detail, which identifies a guest physical page that does not require storage of reverse mappings, such as the zero page, according to one embodiment of the present invention. The process of FIG. 5 is explained using the zero page as an example. The goal of step 504 is to identify the zero page, which stores "zero" (e.g., has all bytes set to zero) and is read-only, by way of a heuristic. First, the memory management module 350 identifies 602 a guest physical page that stores "zero" as a candidate page. However, at this point the memory management module 350 cannot be certain that the guest physical page is a zero page, since the content "zero" can be an actual zero value stored for that particular guest physical page. Thus, the memory management module 350 monitors 604 how many reverse mappings corresponding to the candidate page are stored. If the number of reverse mappings exceeds a predetermined threshold in a predetermined period, then the memory management module 350 identifies 606 that candidate page as an immutable guest physical page with a sufficient number of reverse mappings that could be done away with, which would be a zero page in the case of a Linux guest OS 220. For example, the predetermined threshold can be 30 and the predetermined period can be 40 seconds. If the number of reverse mappings does not exceed the threshold during the predetermined period, then the candidate has failed the heuristic test.

The memory management module 350 may further determine 608 whether the identified immutable guest physical page is a read-only page. To facilitate the determination of a read-only page in the heuristic of FIG. 5, the memory management module 350 adds a flag to the reverse mapping to indicate whether the guest physical page is read-only (i.e., not user writable). This is possible because the VMM 300 typically knows what read/write permissions the guest physical page has, and thus can use such information to add the flag when it creates the reverse mapping. Thus, the memory management module 350 can determine whether the identified immutable guest physical page is a read-only page based on the flag added to the reverse mappings corresponding to the identified guest physical page. Such flag may become stale at some point, because a new reverse mapping is not inserted when a shadow mapping is updated without changing the machine page it updates. These possible errors lead to the need for a memory recovery process, as will be explained in further detail with respect to step 510 of FIG. 4. Although the heuristic test of FIG. 5 determines whether the guest physical page is a read-only page in step 608, step 608 can be optional and the reverse mapping optimization method of FIG. 4 may remove reverse mappings simply for zero pages regardless of whether they are read-only pages.

In one embodiment, the heuristic of FIG. 5 is invoked only after a full scan of the reverse mappings backmap. A full scan of the backmap is most burdensome for the memory management module 350, and its occurrence is thus an indication or clue that the heuristic uses to detect guest physical pages for which the management of reverse mappings is burdensome. In another embodiment, the heuristic of FIG. 5 is invoked only if the full scan of the backmap is performed in excess of a predetermined number of times in a predetermined period. For example, the heuristic is run only if the full scan of the backmap is performed 3 or more times during 60 seconds. This is to make sure that the candidate page is consistently being a burden to the memory management module 350. In still another embodiment, the number of times the heuristic of FIG. 5 can be run is limited to once per 1/100 second.

In one embodiment, the heuristic of FIG. 5 keeps track of one candidate page at a time. However, in other embodiments, multiple candidate pages can be kept track of at a time. Also, although in the embodiment of FIG. 5 the heuristic is run to identify the immutable guest physical page, it is also possible, especially in a para-virtualized system, to identify the immutable guest physical page by the guest OS 220 simply indicating to the memory management module 350 which guest physical page is an immutable guest physical page.

Referring back to FIG. 4, once the immutable guest physical page is identified 504, the memory management module 350 discards 506 existing reverse mappings corresponding to the identified immutable guest physical page. Additionally, the memory management module 350 marks that guest physical page so that it stops 508 adding reverse mappings for that guest physical page. This will prevent the memory management module 350 from giving the identified guest physical page back to the guest OS 220 to relieve memory pressure.

It is noted that a zero page in general does not have many writable reverse mappings and that to install write traces the VMM 300 only needs to keep track of all of the writable reverse mappings for a guest physical page. There is generally no need to keep track of read-only reverse mappings because they are already designated read-only. Thus in one embodiment, in case the immutable guest physical page is a zero page, the memory management module discards all of the read-only reverse mappings while retaining the writable reverse mappings, instead of discarding all reverse mappings for the zero page.

It is possible that the heuristic of FIG. 5 misidentifies a page to be an immutable guest physical page. In such case, the memory management module 350 initiates 510 a virtual memory recovery process by performing a full shadow page table scan to remove all mappings for the guest physical page that the heuristic mistakenly identified as an immutable page. In addition, the memory management module 350 may optionally disable the reverse mapping optimization process of FIG. 4 at the first time the full shadow page table scan is performed.

Note that once an immutable guest physical page (e.g., read-only zero page) is chosen, there are very few situations that will changes its status as the immutable guest physical page. As long as the VMM 300 does not need to invalidate the backing store of the immutable guest physical page, the only cost of designating an immutable guest physical page is the one machine page that cannot be freed by the VMM 300. If the VMM 300 does need to invalidate the backing store (due to read traces or remapping of physical memory), which means that the immutable guest physical page was misidentified, the VMM 300 will trigger a virtual memory recovery process such as a full shadow page table scan and disable the zero page optimization process, as in step 510.

The present invention has the advantage that reverse mappings for immutable guest physical pages need not be stored, thereby significantly reducing the amount of reverse mappings, enhancing the efficiency, and reducing the overhead of the overall virtualized computer system.

The methods described in FIGS. 4 and 5 can be performed in the virtualization software component such as the VMM 300 or the kernel 600, as a computer program product stored in a computer readable medium. However, the methods can be implemented partially or entirely in the form of hardware devices or in firmware, for example, as firmware for the CPUs 110. As such, the present invention is not limited to a particular form or location of the software. Regardless of the location, the software for optimization of reverse mappings according to the present invention is physically stored in a computer readable medium such as the disk 140 or memory 130 in the system hardware 100.

Upon reading this disclosure, those of skill in the art will appreciate still additional alternative embodiments for optimization of reverse mapping through the disclosed principles of the present invention. For example, instead of counting the number of full backmap scans for triggering the heuristic of FIG. 5, one can count the number of reverse mappings queried or inspected and conclude that a guest physical page is a costly one for reverse mappings if that number exceeds a threshold. The immutable guest physical page is of course not limited to a Linux zero page. Any other pages that are immutable and create large numbers of read only reverse mappings could also benefit from the reverse mapping optimization method of the present invention. In addition, another heuristic that can be used to identify the read-only zero pages is to detect the insertion of a block of reverse mappings all mapping the same guest physical page to be read only. Furthermore, it is possible to evaluate how many reverse mappings are saved by the current identified immutable guest physical page and possibly decide to select a different immutable guest physical page if the savings are not satisfactory.

Thus, while particular embodiments and applications of the present invention have been illustrated and described, it is to be understood that the invention is not limited to the precise construction and components disclosed herein. Various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. For a virtual memory of a virtualized computer system in which a virtual page is mapped to a quest physical page which is backed by a machine page and in which a shadow page table entry directly maps the virtual page to the machine page, a computer-implemented method of optimizing reverse mappings, the method comprising:
   identifying an immutable quest physical page; and
   removing existing reverse mappings corresponding to the immutable quest physical page,
   wherein the reverse mappings include shadow page table entries corresponding to a quest physical memory page,
   wherein identifying an immutable guest physical page further comprises:
      determining a number of reverse mappings corresponding to a candidate page during a predetermined period; and
      responsive to the number of reverse mappings exceeding a predetermined threshold, identifying the candidate page as the immutable guest physical page.

2. The computer-implemented method of claim 1, further comprising:
   stopping addition of reverse mappings corresponding to the immutable guest physical page.

3. For a virtual memory of a virtualized computer system in which a virtual page is mapped to a quest physical page which is backed by a machine page and in which a shadow page table entry directly maps the virtual page to the machine page, a computer-implemented method of optimizing reverse mappings, the method comprising:
   identifying an immutable quest physical page; and
   removing existing reverse mappings corresponding to the immutable quest physical page,
   wherein the reverse mappings include shadow page table entries corresponding to a quest physical memory page,
   wherein the immutable guest physical page is identified only after a predetermined number of full scans of a backmap of the reverse mappings in a predetermined period of time.

4. For a virtual memory of a virtualized computer system in which a virtual page is mapped to a quest physical page which is backed by a machine page and in which a shadow page table entry directly maps the virtual page to the machine page, a computer-implemented method of optimizing reverse mappings, the method comprising:
   identifying an immutable quest physical page; and
   removing existing reverse mappings corresponding to the immutable quest physical page,
   wherein the reverse mappings include shadow page table entries corresponding to a quest physical memory page,
   wherein removing existing reverse mappings comprises:
      removing all read-only reverse mappings corresponding to the immutable guest physical page while retaining writable reverse mappings corresponding to the immutable guest physical page.

5. For a virtual memory of a virtualized computer system in which a virtual page is mapped to a quest physical page which is backed by a machine page and in which a shadow page table entry directly maps the virtual page to the machine page, a computer-implemented method of optimizing reverse mappings, the method comprising:
   identifying an immutable quest physical page;
   removing existing reverse mappings corresponding to the immutable quest physical page; and
   responsive to an erroneous identification of the immutable guest physical page, performing a full shadow page table scan,
   wherein the reverse mappings include shadow page table entries corresponding to a quest physical memory page.

6. For a virtual memory of a virtualized computer system in which a virtual page is mapped to a quest physical page which is backed by a machine page and in which a shadow page table entry directly maps the virtual page to the machine page, a computer-implemented method of optimizing reverse mappings, the method comprising:
   identifying a quest physical page that is a zero page; and
   removing existing reverse mappings corresponding to the zero page,
   wherein the reverse mappings include shadow page table entries corresponding to a quest physical memory page,
   wherein identifying the zero page further comprises:
      determining whether number of reverse mappings corresponding to the zero page exceeds a predetermined threshold during a predetermined period.

7. The computer-implemented method of claim 6, wherein identifying the zero page further comprises:
   determining whether the zero page is designated read-only.

8. The computer-implemented method of claim 6, further comprising:
   stopping addition of reverse mappings corresponding to the zero page.

9. For a virtual memory of a virtualized computer system in which a virtual page is mapped to a quest physical page which is backed by a machine page and in which a shadow page table entry directly maps the virtual page to the machine page, a computer-implemented method of optimizing reverse mappings, the method comprising:
   identifying a quest physical page that is a zero page; and
   removing existing reverse mappings corresponding to the zero page,
   wherein the reverse mappings include shadow page table entries corresponding to a quest physical memory page,
   wherein the zero page is identified only after a predetermined number of full scans of a backmap of the reverse mappings in a predetermined period of time.

10. For a virtual memory of a virtualized computer system in which a virtual page is mapped to a quest physical page which is backed by a machine page and in which a shadow page table entry directly maps the virtual page to the machine page, a computer-implemented method of optimizing reverse mappings, the method comprising:
    identifying a quest physical page that is a zero page;

removing existing reverse mappings corresponding to the zero page; and responsive to an erroneous identification of the zero page, performing a full shadow page table scan, wherein the reverse mappings include shadow page table entries corresponding to a quest physical memory page.

11. For a virtual memory of a virtualized computer system in which a virtual page is mapped to a quest physical page which is backed by a machine page and in which a shadow page table entry directly maps the virtual page to the machine page, a physical computer readable medium storing a computer program product configured to perform a computer-implemented method of optimizing reverse mappings, the method comprising:

identifying an immutable quest physical page; and removing existing reverse mappings corresponding to the immutable quest physical page, wherein the reverse mappings include shadow page table entries corresponding to a quest physical memory page, wherein identifying an immutable guest physical page further comprises:

determining a number of reverse mappings corresponding to a candidate page during a predetermined period; and responsive to the number of reverse mappings exceeding a predetermined threshold, identifying the candidate page as the immutable guest physical page.

12. The computer readable medium of claim 11, wherein the method further comprises:

stopping addition of reverse mappings corresponding to the immutable guest physical page.

13. For a virtual memory of a virtualized computer system in which a virtual page is mapped to a quest physical page which is backed by a machine page and in which a shadow page table entry directly maps the virtual page to the machine page, a physical computer readable medium storing a computer program product configured to perform a computer-implemented method of optimizing reverse mappings, the method comprising:

identifying an immutable quest physical page; and removing existing reverse mappings corresponding to the immutable quest physical page, wherein the reverse mappings include shadow page table entries corresponding to a quest physical memory page, wherein the immutable guest physical page is identified only after a predetermined number of full scans of a backmap of the reverse mappings in a predetermined period of time.

14. For a virtual memory of a virtualized computer system in which a virtual page is mapped to a quest physical page which is backed by a machine page and in which a shadow page table entry directly maps the virtual page to the machine page, a physical computer readable medium storing a computer program product configured to perform a computer-implemented method of optimizing reverse mappings, the method comprising:

identifying an immutable quest physical page; and removing existing reverse mappings corresponding to the immutable quest physical page, wherein the reverse mappings include shadow page table entries corresponding to a quest physical memory page, wherein removing existing reverse mappings comprises:

removing all read-only reverse mappings corresponding to the immutable guest physical page while retaining writable reverse mappings corresponding to the immutable guest physical page.

15. For a virtual memory of a virtualized computer system in which a virtual page is mapped to a guest physical page which is backed by a machine page and in which a shadow page table entry directly maps the virtual page to the machine page, a physical computer readable medium storing a computer program product configured to perform a computer-implemented method of optimizing reverse mappings, the method comprising:

identifying an immutable guest physical page;

removing existing reverse mappings corresponding to the immutable guest physical page; and responsive to an erroneous identification of the immutable guest physical page, performing a full shadow page table scan, wherein the reverse mappings include shadow page table entries corresponding to a guest physical memory page.

16. For a virtual memory of a virtualized computer system in which a virtual page is mapped to a guest physical page which is backed by a machine page and in which a shadow page table entry directly maps the virtual page to the machine page, a physical computer readable medium storing a computer program product configured to perform a computer-implemented method of optimizing reverse mappings, the method comprising:

identifying a guest physical page that is a zero page; and removing existing reverse mappings corresponding to the zero page, wherein the reverse mappings include shadow page table entries corresponding to a quest physical memory page, wherein identifying the zero page comprises:

determining whether number of reverse mappings corresponding to the zero page exceeds a predetermined threshold during a predetermined period.

17. The computer readable medium of claim 16, wherein identifying the zero page further comprises:

determining whether the zero page is designated read-only.

18. The computer readable medium of claim 16, wherein the method further comprises:

stopping addition of reverse mappings corresponding to the zero page.

19. For a virtual memory of a virtualized computer system in which a virtual page is mapped to a quest physical page which is backed by a machine page and in which a shadow page table entry directly maps the virtual page to the machine page, a physical computer readable medium storing a computer program product configured to perform a computer-implemented method of optimizing reverse mappings, the method comprising:

identifying a quest physical page that is a zero page; and removing existing reverse mappings corresponding to the zero page, wherein the reverse mappings include shadow page table entries corresponding to a quest physical memory page, wherein the zero page is identified only after a predetermined number of full scans of a backmap of the reverse mappings in a predetermined period of time.

20. For a virtual memory of a virtualized computer system in which a virtual page is mapped to a quest physical page which is backed by a machine page and in which a shadow page table entry directly maps the virtual page to the machine page, a physical computer readable medium storing a computer program product configured to perform a computer-implemented method of optimizing reverse mappings, the method comprising:

identifying a quest physical page that is a zero page;

removing existing reverse mappings corresponding to the zero page; and responsive to an erroneous identification of the immutable zero page, performing a full shadow page table scan, wherein the reverse mappings include shadow page table entries corresponding to a quest physical memory page.

21. A virtualized computer system running on a host computer, including virtual memory where a virtual page is mapped to a quest physical page which is backed by a machine page and in which a shadow page table entry directly maps the virtual page to the machine page, the virtualized computer system including a physical storage device storing computer instructions configured to perform a computer-implemented method of optimizing reverse mappings, and one or more central processing units for executing the computer instructions, the method comprising:

identifying an immutable quest physical page; and removing existing reverse mappings corresponding to the immutable quest physical page, wherein the reverse mappings include shadow page table entries corresponding to a quest physical memory page, wherein identifying an immutable guest physical page further comprises:

determining a number of reverse mappings corresponding to a candidate page during a predetermined period; and responsive to the number of reverse mappings exceeding a predetermined threshold, identifying the candidate page as the immutable guest physical page.

22. The virtualized computer system of claim 21, wherein the method further comprises:

stopping addition of reverse mappings corresponding to the immutable guest physical page.

23. A virtualized computer system running on a host computer, including virtual memory where a virtual page is mapped to a guest physical page which is backed by a machine page and in which a shadow page table entry directly maps the virtual page to the machine page, the virtualized computer system including a physical storage device storing computer instructions configured to perform a computer-implemented method of optimizing reverse mappings, and one or more central processing units for executing the computer instructions, the method comprising:

identifying an immutable guest physical page; and removing existing reverse mappings corresponding to the immutable guest physical page, wherein the reverse mappings include shadow page table entries corresponding to a guest physical memory page, wherein removing existing reverse mappings comprises:

removing all read-only reverse mappings corresponding to the immutable guest physical page while retaining writable reverse mappings corresponding to the immutable guest physical page.

24. A virtualized computer system running on a host computer, including virtual memory where a virtual page is mapped to a guest physical page which is backed by a machine page and in which a shadow page table entry directly maps the virtual page to the machine page, the virtualized computer system including a physical storage device storing computer instructions configured to perform a computer-implemented method of optimizing reverse mappings, and one or more central processing units for executing the computer instructions, the method comprising:

identifying an immutable guest physical page;

removing existing reverse mappings corresponding to the immutable guest physical page; and responsive to an erroneous identification of the immutable guest physical page, performing a full shadow page table scan, wherein the reverse mappings include shadow page table entries corresponding to a guest physical memory page.

25. A virtualized computer system running on a host computer, including virtual memory where a virtual page is mapped to a guest physical page which is backed by a machine page and in which a shadow page table entry directly maps the virtual page to the machine page, the virtualized computer system including a physical storage device storing computer instructions configured to perform a computer-implemented method of optimizing reverse mappings, and one or more central processing units for executing the computer instructions, the method comprising:

identifying a guest physical page that is a zero page; and removing existing reverse mappings corresponding to the zero page, wherein the reverse mappings include shadow page table entries corresponding to a quest physical memory page, wherein identifying the zero page further comprises:

determining whether number of reverse mappings corresponding to the zero page exceeds a predetermined threshold during a predetermined period.

26. The virtualized computer system of claim 25, wherein the method further comprises:

stopping addition of reverse mappings corresponding to the zero page.

27. A virtualized computer system running on a host computer, including virtual memory where a virtual page is mapped to a quest physical page which is backed by a machine page and in which a shadow page table entry directly maps the virtual page to the machine page, the virtualized computer system including a physical storage device storing computer instructions configured to perform a computer-implemented method of optimizing reverse mappings, and one or more central processing units for executing the computer instructions, the method comprising:

identifying a quest physical page that is a zero page; and removing existing reverse mappings corresponding to the zero page, wherein the reverse mappings include shadow page table entries corresponding to a quest physical memory page wherein identifying the zero page further comprises:

determining whether the zero page is designated read-only.

28. A virtualized computer system running on a host computer, including virtual memory where a virtual page is mapped to a quest physical page which is backed by a machine page and in which a shadow page table entry directly maps the virtual page to the machine page, the virtualized computer system including a physical storage device storing computer instructions configured to perform a computer-implemented method of optimizing reverse mappings, and one or more central processing units for executing the computer instructions, the method comprising:

identifying a quest physical page that is a zero page;

removing existing reverse mappings corresponding to the zero page; and responsive to an erroneous identification of the immutable zero page, performing a full shadow page table scan, wherein the reverse mappings include shadow page table entries corresponding to a quest physical memory page.

* * * * *

UNITED STATES PATENT AND TRADEMARK OFFICE
CERTIFICATE OF CORRECTION

PATENT NO. : 7,636,831 B1 Page 1 of 1
APPLICATION NO. : 11/394763
DATED : December 22, 2009
INVENTOR(S) : Subrahmanyam et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 538 days.

Signed and Sealed this

Ninth Day of November, 2010

David J. Kappos
*Director of the United States Patent and Trademark Office*